May 18, 1926.

J. D. MACKEY 1,585,594

CLARINET

Filed July 21, 1922

WITNESSES
F.R. Walker
A.W. Foster

INVENTOR
J.D. Mackey
BY Munn & Co.
ATTORNEYS

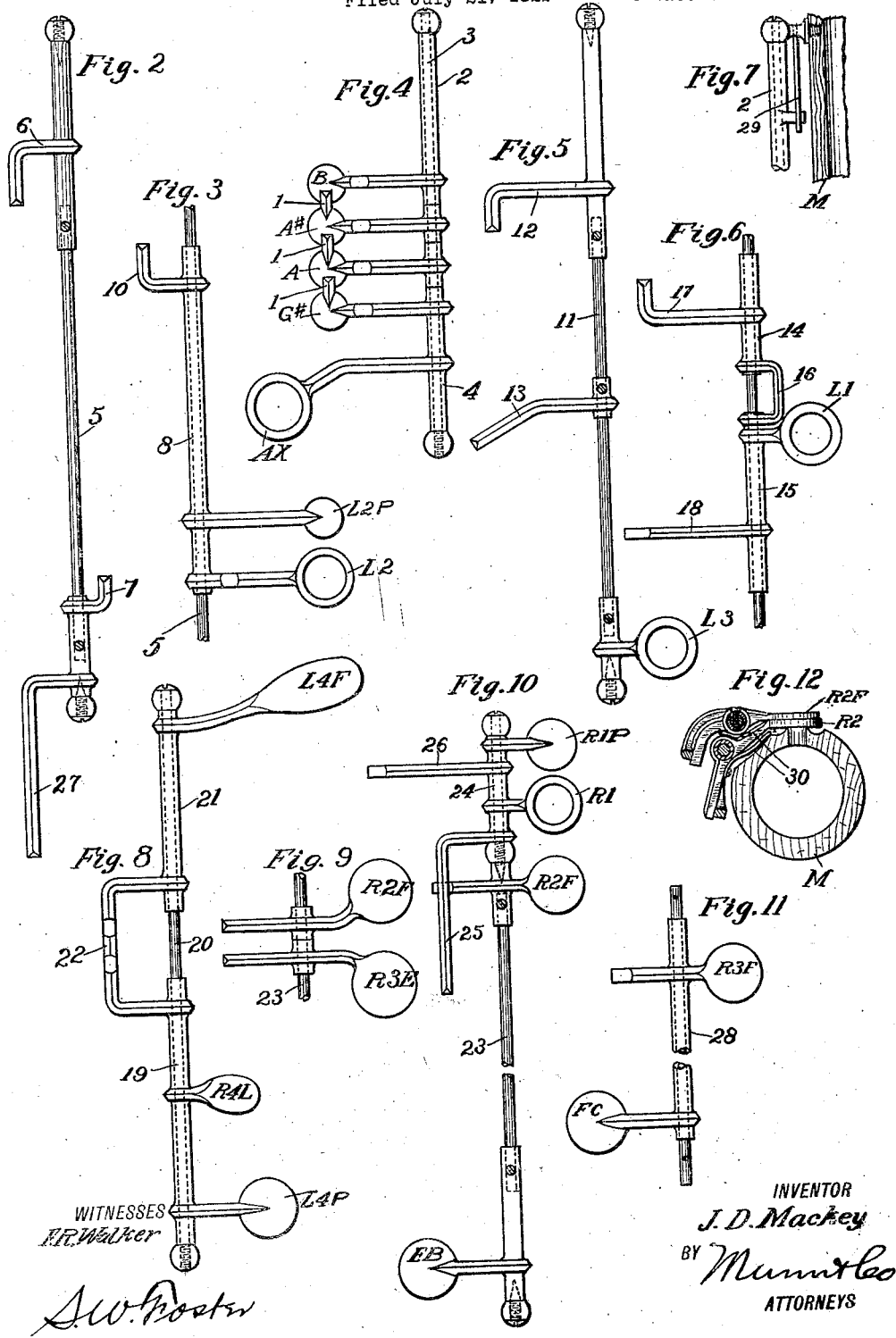

May 18, 1926.

J. D. MACKEY

CLARINET

Filed July 21, 1922

WITNESSES
F.R.Walker

INVENTOR
J.D.Mackey
BY
ATTORNEYS

Patented May 18, 1926.

1,585,594

UNITED STATES PATENT OFFICE.

JAMES DEAN MACKEY, OF PARKERSBURG, WEST VIRGINIA.

CLARINET.

Application filed July 21, 1922. Serial No. 576,583.

This invention relates to improvements in clarinets and more particularly to an improved arrangement of keys and operating means for clarinets or other instruments of the same general class, in which the fingering is done without shifting the hands, or in other words, the right and left hands when once positioned with the fingers properly located on the levers, can form practically all of the notes of the chromatic scale without shifting the position of the hands.

A further object is to provide a clarinet with improved arrangement of keys and operating mechanism which simplify the playing of the instrument reducing the laborious finger manipulation and greatly perfecting the playing possibilities of the instrument.

A further object is to improve upon the construction set forth in my pending application Serial Number 472,405, filed May 25th, 1921.

With these and other objects in view, the invention consists in certain novel features of construction and combinations, and arrangement of parts, as will be more fully hereinafter described and pointed out in the claims.

In the accompanying drawings—

Figures 2, 3, 4, 5, 6, 7, 8, 9, 10 and 11 are detail views in elevation of the several shafts, keys and levers shown on an enlarged scale and arranged in series as they appear on the plan view of Figure 1.

Figure 12 is a view in transverse section through the clarinet taken on the line 12—12, of Figure 1.

Figure 1:
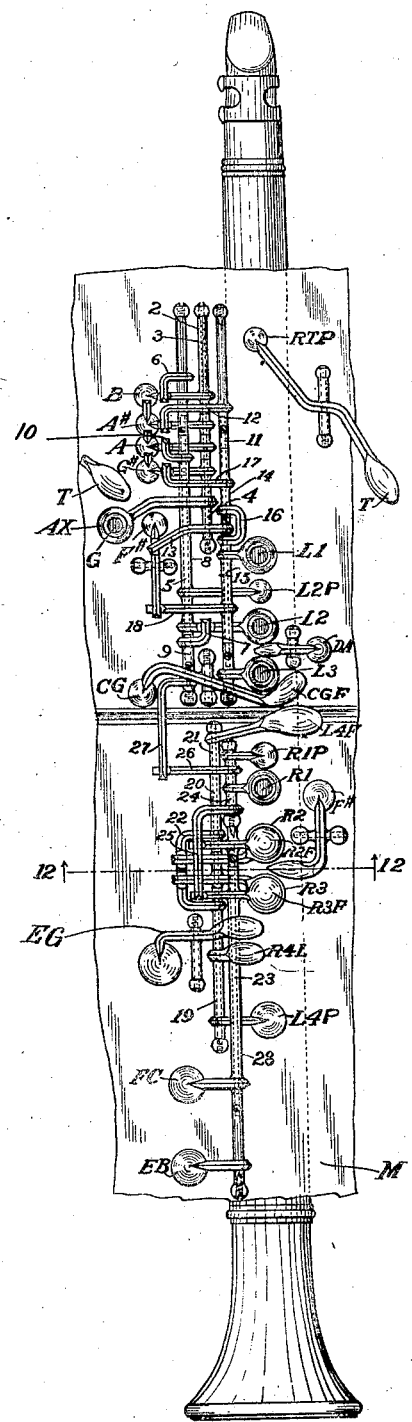
Figure 1 is a plan view of a clarinet the structure being shown as flat for purpose of clearness.
Figure 13:
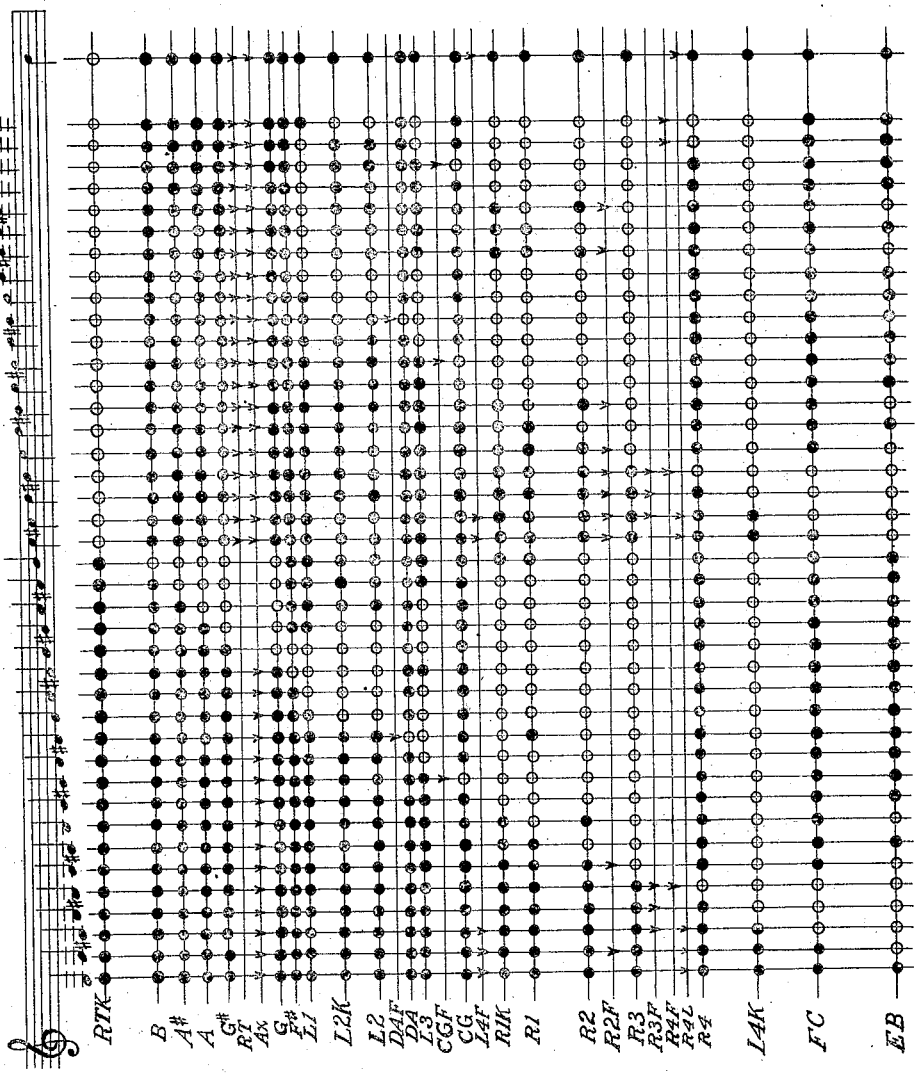

Figure 13 discloses a descriptive scale of my improved clarinet which scale is arranged in alignment with the pads and keys shown in the plan so that by placing the right hand end of the table in line with the plan view of Figure 1, the operation is illustrated.

I shall hereinafter refer to the valves as "pads" and shall use the terms "pads" and "valves" as synonymous terms. In the claims I prefer to use the word "valves" because of its broader significance.

Referring to the drawings, it will be noted that I employ the letters indicating notes of the scale to designate the keys of the upper and lower sections, and employ the letter L to indicate the lefthand, the letter R to indicate the right-hand, the letter T, to indicate the thumb and the numerals 1, 2, 3 and 4 to indicate the fingers of the hands, these letters and numbers also being arranged in combination so that their reference to the particular keys and levers will indicate at a glance the notes which are made, and the thumb or finger of the hand which is utilized in the making of these notes.

M represents the body of the clarinet which is preferably made in sections as is customary, and while I shall hereinafter refer to the instrument as a clarinet, it is obvious that the invention may be used in connection with other forms of similar instruments.

Beginning at the upper portion of Figure 1, or upper section of the instrument, I provide four pads indicated by the characters B, A#, A and G#, the last three named pads being provided with tongues 1 which overlap the adjacent keys.

The pad B, has fixed relation to a sleeve 2 mounted to turn on a shaft 3, while the pads A#, A and G# are loosely mounted on the shaft 3, the key G# being fixed to a sleeve 4 having a ring key AX, fixed thereto and positioned over the opening G, so that when operating this key, the finger functions as a valve or key, as is well known in the art, and by operating this key all of the pads above described can be simultaneously moved and yet the pads are capable of independent movement as will be described.

A shaft 5 is positioned adjacent the shaft 2 and provided with an arm 6, which engages the pad B. This shaft 5 also has an arm 7 which engages a finger lever L2 fixed to a sleeve 8 and mounted on shaft 5 in proximity to the other sleeves and shafts, as shown most clearly in Figure 1, the sleeve 8 has an arm 10 which engages pad A.

A shaft 11 is mounted on the clarinet adjacent the other shafts above described, and is provided with two arms 12 and 13 respectively, the former engaging pad A# and the latter a key F# independently mounted. This shaft 11 has a ring lever L3 fixed thereto and controlling the movement thereof. A pair of sleeves 14 and 15 fixedly connected by a yoke 16, are mounted on the shaft 11 and moved by ring key L1. These shafts have arms 17 and 18 respectively, the former engaging pad G# and the latter engaging pad F#.

A key T controls the pad RTK and the pad DA has its own independent lever. The pad CG also has its independent lever CGL, and the parts above described constitute all pads and keys of the upper section.

Referring to the lower section, the pad L4P is fixed to a sleeve 19 mounted to turn on a shaft 20 and fixedly connected to a second sleeve 21 on the same shaft 20 by means of a yoke 22. On the sleeve 21 the lever L4F is secured and on the sleeve 19 the lever R4L is secured so that this pad L4P can be independently operated by either of the keys L4F or R4L.

23 represents a shaft which is located in proximity to shaft 20 and has fixed to its lower end the pad EB and on its upper end the pad R2F.

In line with this shaft 23, at its upper end a sleeve 24 has rotary mounting and is provided with an arm 25 which overlaps the pad R2F and overlaps a pair of keys R2 and R3 which are mounted on the shaft 26.

A key R1 is fixed to the sleeve 24, and pad R1K is also fixed to the sleeve 24, and an arm 26 is provided on the sleeve 24 and is engaged by an arm 27 fixed to the shaft 5 of the upper register.

On the shaft 23 a sleeve 28 is mounted and carries a pair of pads R3F and FC respectively, the pad R3F being engaged by the arm 25 while the key FC being rigidly connected to the sleeve 28 is movable therewith.

Independently operated pads DA and F# are provided on the upper and lower sections respectively, and an independently operated pad CG is provided on the upper section with its key CGL in close proximity to the key L4F above referred to.

The pad RTP with its thumb lever T is in the upper section and is common to instruments of this character.

In operation the normal position of the hands are as follows:

The left hand operates the upper section and the right hand the lower section. Referring to the upper section, the thumb is normally upon the key T, the first finger on the ring key L1 the second finger on the ring key L2, the third finger on the ring key L3, and the fourth finger on the key L4F and can be easily shifted to the key CGL.

The thumb of the right hand is placed under the instrument in holding position with the first finger on the ring key R1, the second finger on the key R2F, the third finger on the key R3F and the fourth finger on the key EG, and in close proximity to the key R4L. With the fingers thus placed all of the notes of the chromatic scale indicated in Figure 13 can be formed, the upper section pad RTK being opened when the lower section is being operated.

The notes can be made without shifting the fingers to any material extent and the combinations of notes can be formed by operating any pairs of fingers simultaneously.

In trilling, the ring key AX through the medium of the sleeve 4 and pad G, will compel all four of the keys, B, A#, A and G# to close and remain closed, the overlapping fingers 1 of the respective pads compelling them to be operated in unison during such trilling of the instrument. Each of these pads however, is capable of independent operation by reason of the arrangement of shafts and arms as above explained, and as clearly illustrated in Figure 1.

In playing an instrument of this character, it is of course, to be understood that the expert player will control the operation of the levers and keys in many combinations to give the desired notes and tones, and by reason of the construction above described, this manipulation is rendered comparatively easy because of the fact that the fingers are shifted but very slightly, and therefore the performance is not only facilitated, but also the learning of the instrument is facilitated.

In describing the above instrument I have purposely eliminated springs which hold the keys in normal position, but have illustrated in Figure 7 one form of spring 29 which holds the sleeve 2 in normal position, and in Figure 12 I illustrate other forms of spring 30 for holding the keys in normal position.

It is obvious that this invention is not limited to the particular form of spring employed, and it is apparent that springs or elastic members of some sort are to be utilized for holding the keys and parts in normal position and returning them to such position when permitted.

It is needless to describe the making of each note as the scale is clearly illustrated in Figure 13, and the same reference characters are employed on the scale, correspond with the keys of the instrument, and by registering this scale with the plan view Figure 1, it will be readily seen how the notes can be formed.

In reading this scale, it is to be understood that the solid circles indicate depressed keys, the open circles raised keys, and the arrows indicate the fingers employed on the key operating levers.

While I have described my invention in connection with a clarinet, it is to be understood that it applies with equal facility to other forms of wind instrument.

Various slight changes might be made in the general form and arrangement of parts described without departing from my invention, and hence I do not limit myself to the precise details set forth but consider myself at liberty to make such changes and alterations as fairly fall within the spirit and scope of the appended claims.

I claim:

1. In a musical instrument of the character stated, the combination of upper and lower sections, said upper section being operated entirely by the thumb and fingers of one hand, with means permitting the fingers on the lower section to control certain valves of the upper section.

2. In a musical instrument of the character described, the combination with upper and lower sections, of trilling valves on the upper section, and means permitting lower section levers to operate the trilling valves.

3. A musical instrument of the character stated, comprising upper and lower sections, a set of trilling valves on the upper section, and means permitting the trilling valves to be operated by keys of either section.

4. A musical instrument of the character described having six chromatic tones controlled by valves, and means permitting the use of three fingers on each hand in regular succession to sound the six chromatic tones.

5. A musical instrument of the character stated, comprising upper and lower sections, a set of trilling valves on the upper section, valves controlling the notes of the lower section, and means for simultaneously operating the trilling valves with the last-named valves.

6. A musical instrument of the character stated, comprising upper and lower sections, a set of trilling valves on the upper section, valves controlling the notes of the lower section, means for simultaneously operating the trilling valves with the last-named valves, said means comprising a shaft, and arms on the shaft engaging certain of said valves whereby they are compelled to operate in unison.

7. A musical instrument of the character stated, comprising upper and lower sections, a set of trilling valves on the upper section, valves controlling the notes of the lower section, means for simultaneously operating the trilling valves with the last-named valves, said means comprising a shaft, arms on the shaft engaging certain of said valves whereby they are compelled to operate in unison, and finger-operated keys controlling the manipulation of certain combinations of said arms and valves whereby the fingers of the hands can control all of the valves without movement of the hands on the instrument.

JAMES DEAN MACKEY.